United States Patent

Schiessle et al.

[11] Patent Number: 5,394,082
[45] Date of Patent: Feb. 28, 1995

[54] MAGNETIC LAUER COMPOSITIONS FOR USE IN A DEVICE FOR DETERMINING THE POSITION OF AN AXIALLY MOVABLE BODY

[75] Inventors: Edmund Schiessle, Schorndorf; Khaldoun Alasafi, Schwäbisch-Gmünd; Ralf Gutöhrlein, Fellbach-Schmiden, all of Germany

[73] Assignee: Mercedes-Benz AG, Stuttgart, Germany

[21] Appl. No.: 10,857

[22] Filed: Jan. 29, 1993

[30] Foreign Application Priority Data

Jan. 30, 1992 [DE] Germany .................... 4202535

[51] Int. Cl.6 ........................................ G01B 7/14
[52] U.S. Cl. ...................... 324/207.22; 324/207.15; 324/207.19
[58] Field of Search .............. 324/207.15, 207.18, 324/207.19, 207.22, 207.24; 428/611

[56] References Cited

U.S. PATENT DOCUMENTS

| | | | |
|---|---|---|---|
| 3,108,213 | 10/1963 | Golder et al. | 324/207.19 X |
| 3,956,973 | 5/1976 | Pomplas | 324/207.24 X |
| 3,961,243 | 6/1976 | Schulz | 324/207.19 |
| 4,629,983 | 12/1986 | Boomgaard et al. | 324/207.19 |
| 4,667,158 | 5/1987 | Redlich | 324/207.19 |
| 4,866,378 | 9/1989 | Redlich | 324/207.19 |
| 5,010,298 | 4/1991 | Uemura | 324/207.19 |
| 5,083,084 | 1/1992 | Bauer et al. | 324/207.19 |
| 5,252,918 | 10/1993 | VanBerg et al. | 324/207.19 |

FOREIGN PATENT DOCUMENTS 3411980 10/1985 Germany .
3712054 10/1988 Germany .
4020369 1/1992 Germany .

*Primary Examiner*—Gerard R. Strecker
*Assistant Examiner*—Warren S. Edmonds
*Attorney, Agent, or Firm*—Evenson, McKeown, Edwards & Lenahan

[57] ABSTRACT

A device for determining the position of an axially movable body wherein the position of the body is deduced from the inductance of a coil arrangement. A layer which has a layer structure containing less than 8% by weight of P, preferably up to 3% by weight of phosphorus, up to 2% by weight of an element of main group IV or V, in particular antimony, and up to 5% by weight of a transition metal element, in particular cobalt, is deposited on the body. The percentages by weight resulting from the sum are increased up to 100% with nickel. An axial movement of the body to which the layer is joined, modifies the magnetic flux in a coil arrangement comprising at least one coil. The changes in inductance resulting therefrom are measured and the position of the body is deduced therefrom.

15 Claims, 2 Drawing Sheets

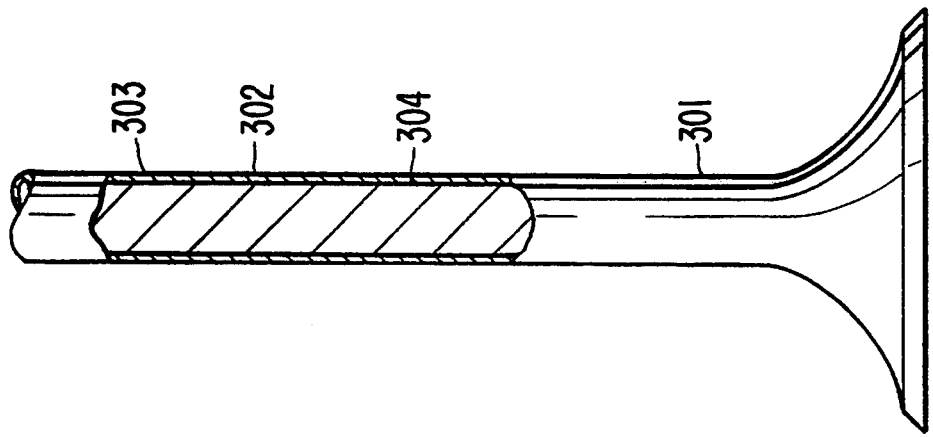
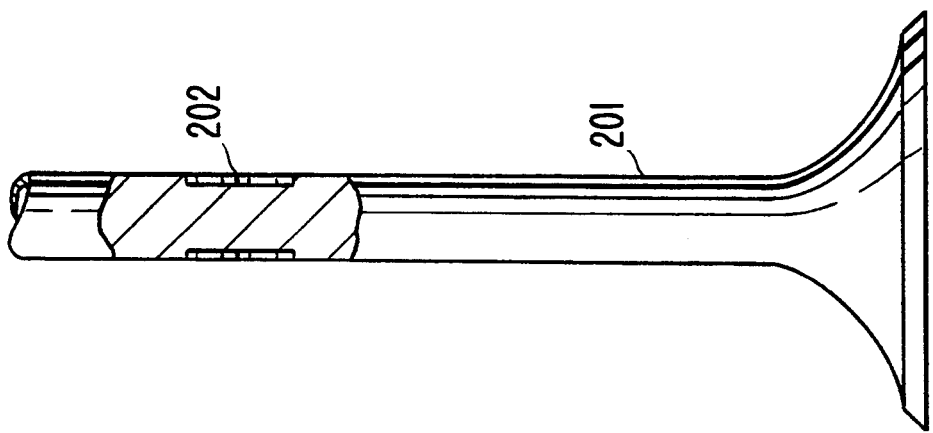

MAGNETIC LAUER COMPOSITIONS FOR USE IN A DEVICE FOR DETERMINING THE POSITION OF AN AXIALLY MOVABLE BODY

BACKGROUND AND SUMMARY OF THE INVENTION

The invention relates to a device for determining the position of an axially movable body and, in particular, to a device for determining the position of an axially movable body wherein the position of the body is deduced from the inductance of a coil arrangement. A layer whose magnetic properties modify the inductance of the coil arrangement is deposited on the body. An axial movement of the body, to which the layer is joined, modifies the magnetic flux in a coil arrangement comprising at least one coil and the change in the inductance resulting therefrom is measured and the position of the body is deduced therefrom.

In a device of the generic type, for example German Patent Document DE 40 20 369 A1, a ferromagnetic layer is deposited on a body whose position is to be determined. A layer composed of a material which has good electrical conductivity but is not ferromagnetic is additionally deposited on said ferromagnetic layer in order to cope with the problem of the eddy currents which occur. The ferromagnetic layer deposited on the body modifies the inductance of a coil in the event of movement. The position of the body is then determined by evaluating the inductance.

It could be regarded as disadvantageous in this connection that a second layer has to be deposited in order to cope with the problem of eddy currents because one more operation has to be expended on the deposition. In addition, problems may occur in the finished product because of, for example, mechanical stresses occurring as a consequence of different thermal coefficients of expansion in the two layers. Furthermore, the thicknesses of the layer and the frequency of the alternating current flowing through the coil have to be matched to one another, thereby imposing limitations on the flexibility of use of the device.

To determine the position of an axially movable body, German Patent Document DE 37 12 054 A1 discloses the possibility of producing the body from a soft-magnetic material, then introducing the body into a coil arrangement and thus determining the position from the change in the inductance.

If the position of an axially movable body which cannot be produced from a soft-magnetic material for reasons of, for example, the mechanical material hardness required (for example ceramic) is to be determined, the subject described in German Patent Document DE 37 12 054 A1 cannot be used.

Furthermore, a device is known in which a permanent magnet is moved in the interior of a coil. The velocity of the permanent magnet can then be determined from the induced voltage. In principle, it is consequently possible to obtain the position of the permanent magnet by integrating the velocity. Such an arrangement is referred to as a plunger coil arrangement.

It could be regarded as disadvantageous in this connection that errors may occur in the integration. Such an arrangement is also only of limited usability since it is restricted to the use of permanent magnets.

There is therefore needed a device for determining the position of an axially movable body in such a manner that the device has as high a response sensitivity as possible and, at the same time, operates as independently as possible of ambient conditions and has various possible application possibilities.

These needs are met according to the present invention, in a device for determining the position of an axially movable body wherein the position of the body is deduced from the inductance of a coil arrangement. A layer whose magnetic properties modify the inductance of the coil arrangement is deposited on the body. An axial movement of the body, to which the layer is joined, modifies the magnetic flux in a coil arrangement comprising at least one coil and the change in the inductance resulting therefrom is measured and the position of the body is deduced therefrom. The layer deposited on the body by atomic growth has a layer structure containing less than 8% by weight of phosphorus, preferably up to 3% by weight of phosphorus, up to 2% by weight of an element of main group IV or V, in particular antimony or lead, and up to 5% by weight of a transition metal element, in particular cobalt or iron. The percentages by weight resulting from the sum are increased up to 100% with nickel.

In the subject of the present invention, a soft magnetic layer is deposited in the form of a ring on the axially movable body on one part of the outer circumference. The soft-magnetic layer interacts with a coil arrangement comprising at least one coil. As the position of the soft-magnetic layer changes as a result of an axial movement of the movable body, the inductance of the coils or the coil changes. The inductance is consequently a direct measure of the position of the axially movable body.

Other objects, advantages and novel features of the present invention will become apparent from the following detailed description of the invention when considered in conjunction with the accompanying drawings.

BRIEF DESCRIPTION OF THE DRAWINGS

FIG. 2 is a side view of a second exemplary embodiment of a device according to the present invention for determining the position of an axially movable body; and FIG. 3 is a side view of a third exemplary embodiment of a device according to the present invention for determining the position of an axially movable body.

DETAILED DESCRIPTION OF THE DRAWINGS

Figure 1:
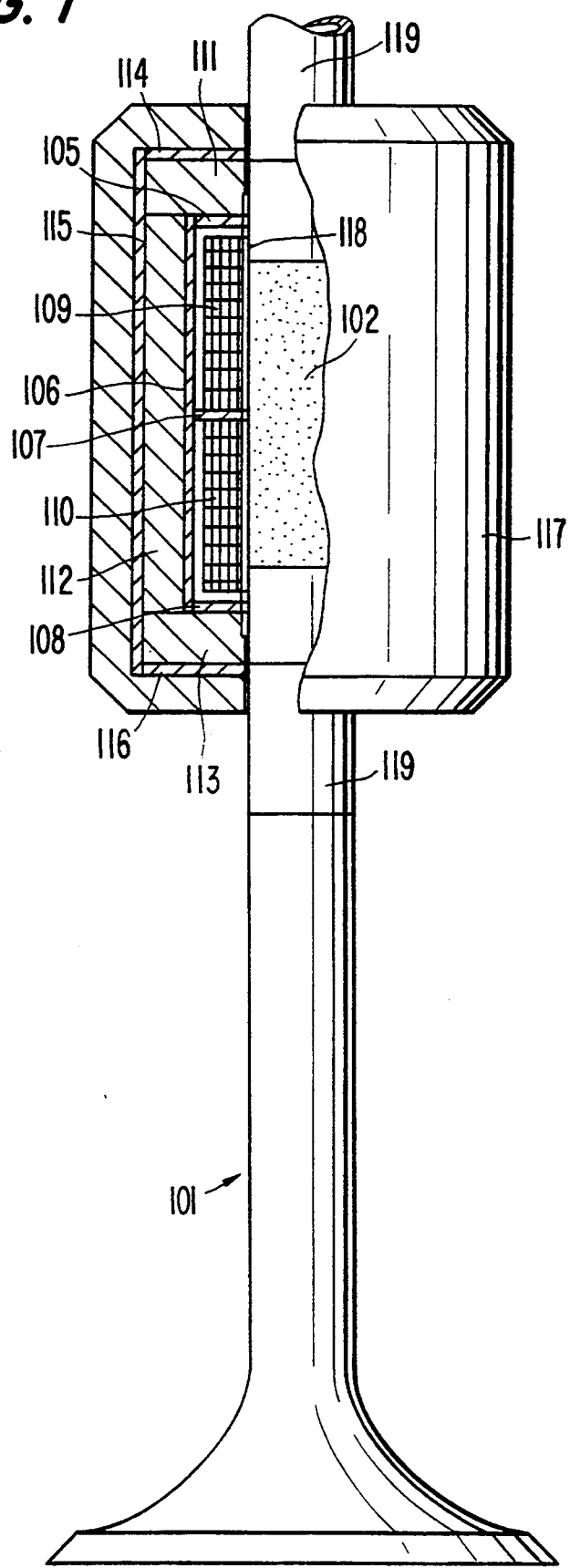
FIG. 1 is a partial cross-section view of a first exemplary embodiment of a device according to the present invention for determining the position of an axially movable body.

FIG. 1 shows a first device according to the present invention having a layer with certain properties.

A suitable composition of a layer having the required properties consists in adopting a layer structure containing less than 8% by weight of phosphorus, preferably up to 3% by weight of phosphorus, less than 2% by weight of antimony and less than 5% by weight of cobalt. The percentages by weight resulting from the sum are increased up to 100% with nickel. It is also possible to use, instead of cobalt Co, another transition metal, for example iron. Equally, another element of main group IV or V, for example lead, may be used instead of antimony Sb.

The transition metal brings about an increase in the crystallization temperature of the layer from approximately 600° K. to greater than 700° K. Likewise, the Curie point is increased to a value of greater than 700° K. by the transition metal.

As a result of the high proportion of atomic bonds, the element antimony (or lead) brings about an appreciable increase in the electrical resistivity, thereby providing a particularly efficient attenuation of the eddy currents.

The phosphorus content of the layer is responsible for the amorphicity and the magnetic isotropy and, consequently, for the soft-magnetic properties of the layer, in which connection a P component of more than 3% by weight results in a decrease in the ferromagnetism and, consequently, in a decrease in the magnetostriction.

The surface of the body on which the layer is to be deposited must first be rendered electrically conducting so that the ions are able to deposit as a result of reduction. This can be done, for example, by first coating the surface by vapor deposition. The body is then immersed in a bath composed of the elements in accordance with the above list, account being taken of the respective percentages by weight. The layer can then be deposited on the surface of the body by chemical reduction at a temperature of approximately 370° K.

So that the layer can be effectively protected against external magnetic fields, two further soft magnetic nonmagnetostrictive layer rings are deposited on the body by one of the processes mentioned. The components 114, 115, 116 described below, together with the two layer rings 119, then form the magnetic screening. For mechanical and chemical protection of the measuring layer, a layer having a higher P content (greater than 8% by weight of P) is then deposited in turn. The measuring layer may have a composition $A_{1-x}B_x$. A may be a mixture of, preferably, two ferromagnetic transition metals M1 and M2, where M1 may be Ni and M2 Co, and B may be a mixture of metalloids m1 and m2, where m1 may be P and m2 Sb. A possible quantitative ratio may comprise $(M1_{0.9}, M2_{0.1})_{0.8}(m1_{0.5}, m2_{0.5})_{0.2}$. The magnetostriction constant can in principle be varied by means of the composition of the layer. With a continuous change in the quantitative ratio M1, M2 from 9:1 to 1:9, the magnetostriction constant converts from negative to positive sign, a minimum magnetostriction being passed through at a quantitative ratio of approximately 1:1.

As an exemplary embodiment of an axially movable body, FIG. 1 shows a valve shaft 101 on which a coating 102 is deposited. This coating 102 has a structure which was described in the above paragraphs and forms, together with the components 105, 106, 107 and 108, the magnetic flux return path for the coil arrangement comprising the two coils 109 and 110. The components 105, 106, 107 and 108 are composed of a soft-magnetic material which also has a low magnetostriction, such as, for example, Permenorm. An axial movement of the valve shaft 101 changes the magnetic flux in the coils 109 and 110. Consequently, the inductance of the coils 109 and 110 also then changes. This change in the impedance can then be evaluated with an evaluation device which is known per se.

In the exemplary embodiment of FIG. 1, the two coils 109 and 110 are connected in a half-bridge circuit. The position of the valve shaft 101 can then be deduced from the change in the impedance of the coil 109. Advantageously, interference effects can be eliminated by further components. For example, the components 105, 106, 107 and 108 may be surrounded by components 111, 112 and 113 which are spacers composed of an electrical insulating and nonmagnetic material, for example a suitable plastic. These components may then be surrounded in turn by the components 114, 115 and 116 which, for the purpose of screening from interfering external magnetic fields, are composed of a highly softmagnetic material having a high electrical resistivity. The arrangement in accordance with the exemplary embodiment of FIG. 1 is held by a connector 117. Since the layer on the valve shaft has a certain thickness (order of magnitude approximately 30 μm), a ring groove 118 is provided in which the layer can then move without contact.

FIG. 2 shows a valve shaft 201 in which, in contrast to the valve shaft 101 of the exemplary embodiment of FIG. 1, a ground-in seating is present in the valve shaft 201 so that the layer terminates flushly with the surface of the valve shaft 201. In the overall arrangement, the ring groove 118 of the exemplary embodiment of FIG. 1 may then be omitted.

FIG. 3 shows a valve shaft in which the flush termination with the surface is achieved by providing layers 303 and 304, preferably nickel/phosphorus layers, adjacently in each case at the top and bottom of the layer 302, which nickel/phosphorus layers are non magnetostrictive, not soft-magnetic and nonmagnetic.

In principle, such measurements are not limited to the valve shaft described in the exemplary embodiments. On the contrary, the device can also be provided on other components which are axially movable and whose position is to be determined.

Likewise, the casings comprising a plurality of components in the exemplary embodiments and composed of one material may also comprise only one component of the appropriate shape.

The deposition of the layer 102, 202, 302 and of the layer rings 119 by atomic growth can be carried out by chemical reduction at the surface, by electrolytic deposition, by the PVD (physical vapor deposition) or CVD (chemical vapor deposition) processes or by ion implantation, or by variations of the processes mentioned (plasma, laser, ultrasound and the like).

Furthermore, for the purpose of optimizing the electrical resistivity and the magnetic properties of the layer, the layer may also be doped with traces of rare earth metals.

Fine solid powders, for example oxides, carbides or plastics, such as Hostaflon or the like, may furthermore also be added to the layer. This achieves the result that the solids dispersibly incorporated in the layer make the migration of the Bloch walls difficult and consequently increase the magnetostriction properties of the layer.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for determining a position of an axially movable body, comprising:

a coil arrangement coaxially arranged around said body, said coil arrangement having an inductance from which said position of the body is deduced;

a layer having magnetic properties which modify the inductance of the coil arrangement, said layer being deposited on said body by atomic growth in a region electrically interacting with said coil arrangement as said body moves;

wherein an axial movement of said body, to which said layer is joined, modifies a magnetic flux in said coil arrangement comprising at least one coil, and the resulting change in the inductance therefrom is measured in order to allow for the determination of the position of the body; and wherein said magnetic properties of said layer are obtained by a layer composition comprising less than 8% by weight of phosphorous, up to 2% by weight of an element from one of main groups IV and V of the Periodic Table, and up to 5% by weight of a transition metal element, the percentages by weight resulting from the sum being increased up to 100% with nickel.

2. A device according to claim 1, wherein said layer structure contains up to 3% by weight of phosphorous.

3. A device according to claim 2, wherein said element of one of main groups IV and V is one of antimony and lead, and wherein said transition metal element is one of cobalt and iron.

4. A device according to claim 1, wherein the coil arrangement comprises two coils, which arrangement is coaxially disposed with respect to the body and surrounds the body, and in that the top, bottom and outside surface of the coils are surrounded by components composed of a soft-magnetic material which has a low magnetostriction, in that the two coils are connected in a half-bridge circuit, and in that the center of the layer is between the two coils in a rest position of the body.

5. A device according to claim 4, wherein the components surrounding the coil arrangement are surrounded by additional components composed of an electrically insulating and non-magnetic material.

6. A device according to claim 5, wherein said additional components are composed of plastic.

7. A device according to claim 5, wherein the additional components are furthermore surrounded by fourth components composed of a highly soft-magnetic material having a high electrical resistivity.

8. A device according to claim 1, wherein the layer is flush with the surface of the body.

9. A device according to claim 4, wherein the layer is flush with the surface of the body.

10. A device according to claim 5, wherein the layer is flush with the surface of the body.

11. A device according to claim 7, wherein the layer is flush with the surface of the body.

12. A device according to claim 1, wherein the layer is doped with traces of rare-earth metals.

13. A device according to claim 1, wherein fine solid powders are added to the layer.

14. A device according to claim 1, wherein layer rings are additionally located on the body at an axial distance from the layer, said layer rings having an identical structure to the layer.

15. A device for determining a position of an axially movable body, comprising:

a coil arrangement coaxially arranged around said body, said coil arrangement having an inductance from which said position of the body is deduced;

a layer having magnetic properties which modify the inductance of the coil arrangement, said layer being deposited on said body by atomic growth in a region electrically interacting with said coil arrangement as said body moves;

wherein an axial movement of said body, to which said layer is joined, modifies a magnetic flux in said coil arrangement comprising at least one coil, and the resulting change in the inductance therefrom is measured in order to allow for the determination of the position of the body; and wherein said magnetic properties of said layer are obtained by a layer composition comprising 3 to 5% by weight of phosphorous, up to 2% by weight of the element antimony or lead, and up to 5% by weight of the element cobalt or iron, the percentages by weight resulting from the sum being increased up to 100% with nickel.

* * * * *